(12) United States Patent
Milesi et al.

(10) Patent No.: US 8,093,844 B2
(45) Date of Patent: Jan. 10, 2012

(54) BRAKING FUNCTION FOR BRUSHLESS DC MOTOR CONTROL

(75) Inventors: Alejandro G. Milesi, Buenos Aires (AR); Bruno L. Uberti, Capital Federal (AR)

(73) Assignee: Allegro Microsystems, Inc., Worcester, MA (US)

( * ) Notice: Subject to any disclaimer, the term of this patent is extended or adjusted under 35 U.S.C. 154(b) by 502 days.

(21) Appl. No.: 12/402,580

(22) Filed: Mar. 12, 2009

(65) Prior Publication Data
US 2010/0231147 A1    Sep. 16, 2010

(51) Int. Cl.
H02K 7/10    (2006.01)
(52) U.S. Cl. .............. 318/362; 318/375; 318/400.35
(58) Field of Classification Search ............ 318/375, 318/400.35, 362, 400.09, 380, 376, 703, 318/701
See application file for complete search history.

(56) References Cited

U.S. PATENT DOCUMENTS

| | | |
|---|---|---|
| 3,743,911 A | 7/1973 | Erler |
| 4,862,052 A | 8/1989 | Unsworth et al. |
| 4,916,370 A | 4/1990 | Rowan et al. |
| 5,003,241 A | 3/1991 | Rowan et al. |
| 5,045,920 A | 9/1991 | Vig et al. |
| 5,264,783 A | 11/1993 | Vig et al. |
| 5,389,889 A | 2/1995 | Towne et al. |
| 5,442,283 A | 8/1995 | Vig et al. |
| 5,486,747 A | 1/1996 | Welch |
| 5,517,112 A | 5/1996 | Vig et al. |
| 5,581,179 A | 12/1996 | Engel et al. |
| 5,619,137 A | 4/1997 | Vig et al. |
| 5,621,319 A | 4/1997 | Bilotti et al. |
| 5,650,719 A | 7/1997 | Moody et al. |
| 5,686,894 A | 11/1997 | Vig et al. |
| 5,694,038 A | 12/1997 | Moody et al. |
| 5,708,578 A | 1/1998 | Stoddard et al. |
| 5,729,130 A | 3/1998 | Moody et al. |
| 5,744,574 A | 4/1998 | Ezzell et al. |
| 5,917,320 A | 6/1999 | Scheller et al. |
| 6,037,675 A | 3/2000 | Yoshida et al. |

(Continued)

FOREIGN PATENT DOCUMENTS
DE    198 04 597 A1    8/1998
(Continued)

OTHER PUBLICATIONS

Datasheet, Allegro A1441, "Low-Voltage Full-Bridge Brushless DC Motor Driver with Hall Element Commutation", 2005-2006, 4 pages.

(Continued)

*Primary Examiner* — Karen Masih
(74) *Attorney, Agent, or Firm* — Daly, Crowley, Mofford & Durkee, LLP

(57) ABSTRACT

A motor control circuit that features a smart, two-phase braking operation is presented. The motor control circuit includes a motor drive circuit to apply a brake current to a coil of an external motor for active braking of the motor. The motor control circuit further includes a braking control circuit, coupled to the motor drive circuit and responsive to an externally generated control signal, to control the active braking by the motor drive circuit so that the active braking occurs in two phases. The two phases include a first phase that includes a first portion of the active braking and a second phase that includes back electromotive force (BEMF) voltage sensing and a second portion of the active braking.

20 Claims, 9 Drawing Sheets

U.S. PATENT DOCUMENTS

| | | |
|---|---|---|
| 6,181,092 B1 | 1/2001 | Turner |
| 6,563,284 B2 | 5/2003 | Teutsch et al. |
| RE38,338 E | 12/2003 | Yoshida et al. |
| 6,747,300 B2 | 6/2004 | Nadd et al. |
| 6,819,069 B2 | 11/2004 | Hornberger et al. |
| 6,891,739 B2 | 5/2005 | Nadd et al. |
| 7,030,584 B1 | 4/2006 | Alberkrack et al. |
| 7,148,642 B2 | 12/2006 | Brannen et al. |
| 7,276,867 B2 | 10/2007 | Alberkrack et al. |
| 7,309,967 B2 | 12/2007 | Moser et al. |
| 7,437,201 B2 | 10/2008 | Cullen |
| 7,590,334 B2 | 9/2009 | Yabusaki et al. |
| 7,606,624 B2 | 10/2009 | Cullen |
| 2002/0060544 A1 | 5/2002 | Teutsch et al. |
| 2004/0135534 A1 | 7/2004 | Cullen |
| 2005/0212501 A1 | 9/2005 | Acatrinei |
| 2006/0097677 A1 | 5/2006 | Brannen et al. |
| 2006/0097678 A1 | 5/2006 | Alberkrack et al. |
| 2006/0208821 A1 | 9/2006 | Alberkrack |
| 2006/0238154 A1 | 10/2006 | Brannen et al. |
| 2008/0272724 A1 | 11/2008 | Hayashi |
| 2009/0021205 A1 | 1/2009 | Cullen |
| 2009/0026991 A1* | 1/2009 | Boscolo Berto ......... 318/400.35 |
| 2009/0039820 A1 | 2/2009 | Milano et al. |

FOREIGN PATENT DOCUMENTS

| | | |
|---|---|---|
| EP | 0 252 898 A | 1/1988 |
| JP | 01 170386 A | 7/1989 |

OTHER PUBLICATIONS

Datasheet, Allegro A1444-A1445, "Low-Voltage Full-Bridge Brushless DC Motor Driver with Hall Commutation, Externally Controlled Speed Regulation, Soft-Switching, Reverse Battery and Short Circuit/Thermal Shutdown Protection", 2006, 12 pages.

Datasheet, Sanyo, LB11961V, "Monolithic Digital IC—Single-Phase Full-Wave Fan Motor Driver", Mar. 2007, 7 pages.

Datasheet, Sanyo, LB11970FV, "Monolithic Digital IC—Single-Phase Full-Wave Driver", Mar. 2007, 7 pages.

Datasheet, Melexis, MLX90283, "BLDC Vibration Motor Driver" Oct. 2007, 10 pages.

Datasheet, Sanyo LB11975, "High-Speed CD-ROM Spindle Motor Driver IC", Jan. 2001, 12 pages.

Invitational to Pay Additional Fees and, Where Applicable, Protest Fee, PCT/US2008/069919 dated Feb. 13, 2009, 8 pages.

Notification of Transmittal of the International Search Report and the Written Opinion of the International Searching Authority, the International Search Report and Written Opinion of the International Searching Authority for PCT/US2008/069919, dated Apr. 1, 2009, 20 pages.

Notification Concerning Transmittal of International Preliminary Report on Patentability and the International Preliminary Report on Patentability for PCT/US2008/069919, dated Feb. 9, 2010, 13 pages.

Freescale Semiconductor: "H-Bridge Gate Driver IC Document No. MC33883" [Online], Jan. 1, 2007, XP007906846.http:..www.freescale.com/files/analog/doc/data_sheet/MC33883.pdf, [retrieved on Jan. 16, 2009], pp. 1, 10; figure 1, 21 pages.

U.S. Appl. No. 11/835,721, filed Aug. 8, 2007.

U.S. Appl. No. 11/855,822, filed Aug. 8, 2007.

Allegro Datasheet A1444 and A1445, Low-Voltage Full-Bridge Brushless DC Motor Driver with Hall Commutation, Externally Controlled Speed Regulation, Soft Switching, and Reverse Battery, Short Circuit, and Thermal Shutdown Protection, 2009, 8 pages.

Allegro Datasheet A1442, Low-Voltage Full-Bridge Brushless DC Motor Driver with Hall Commutation and Soft Switching, and Reverse Battery, Short Circuit, and Thermal Shutdown Protection, 2006-2008, 7 pages.

* cited by examiner

BRAKING FUNCTION FOR BRUSHLESS DC MOTOR CONTROL

CROSS-REFERENCE TO RELATED APPLICATIONS

Not applicable.

STATEMENT REGARDING FEDERALLY SPONSORED RESEARCH

Not applicable.

FIELD OF THE INVENTION

This invention relates generally to motor control and, more particularly, to braking motor control for single-coil brushless DC motors.

BACKGROUND OF THE INVENTION

A brushless DC (BLDC) motor is braked by generating a negative torque which slows the rotation of the motor. A periodic determination is performed to detect when the application of the braking torque should be discontinued. It may determine, for example, when a specified time interval has elapsed (a fixed braking time approach) or a sensed motor speed has achieved a desired threshold value (a speed sensing approach). One prior technique for braking uses the back electromotive force (EMF) voltage induced in a coil of the motor. This "passive braking" generates a negative torque by shorting a coil. Another braking technique that has been used in the past is "active braking". Active braking provides an active excitation (by applying a drive current) to a motor coil to generate a braking torque. Active braking allows a much faster deceleration than passive braking.

Braking may be based on a fixed active braking time or employ speed sensing, as mentioned above. A drawback to the fixed time approach is that is does not adapt well to changing motor characteristics and can allow reverse motor spinning to occur. Speed sensing requires some type of feedback from the motor. In the case of active braking, the feedback may be based on the output of a magnetic field sensor, e.g., a Hall-effect sensor. Back EMF voltage has also been used for speed sensing, but only in three-coil motor applications. In that type of application, two active coils are used for active braking. A third, non-active coil is available for the back EMF speed sensing. The three-coil design thus enables continuous sensing in any of the three coils. The back EMF-based speed sensing uses a voltage measurement taken across the coil, since the peak amplitude of the back EMF voltage is proportional to the speed.

SUMMARY OF THE INVENTION

In general, in one aspect, the invention is directed to a motor control circuit. The motor control circuit includes a motor drive circuit to apply a brake current to a coil of an external motor for active braking of the motor. The motor control circuit further includes a braking control circuit, coupled to the motor drive circuit and responsive to an externally generated control signal, to control the active braking by the motor drive circuit so that the active braking occurs in two phases. The two phases include a first phase that comprises a first portion of the active braking and a second phase that comprises back electromotive force (BEMF) voltage sensing and a second portion of the active braking.

Embodiments of the invention may include one or more of the following features. The braking control circuit can include circuitry to start the second phase when a first low speed threshold (FLST) is reached during the first phase. The braking control circuit can also include circuitry to determine when a second low speed threshold (SLST) is reached during the second phase.

BRIEF DESCRIPTION OF THE DRAWINGS

The foregoing features of the invention, as well as the invention itself, may be more fully understood from the following detailed description of the drawings, in which.

DETAILED DESCRIPTION

Figure 1:
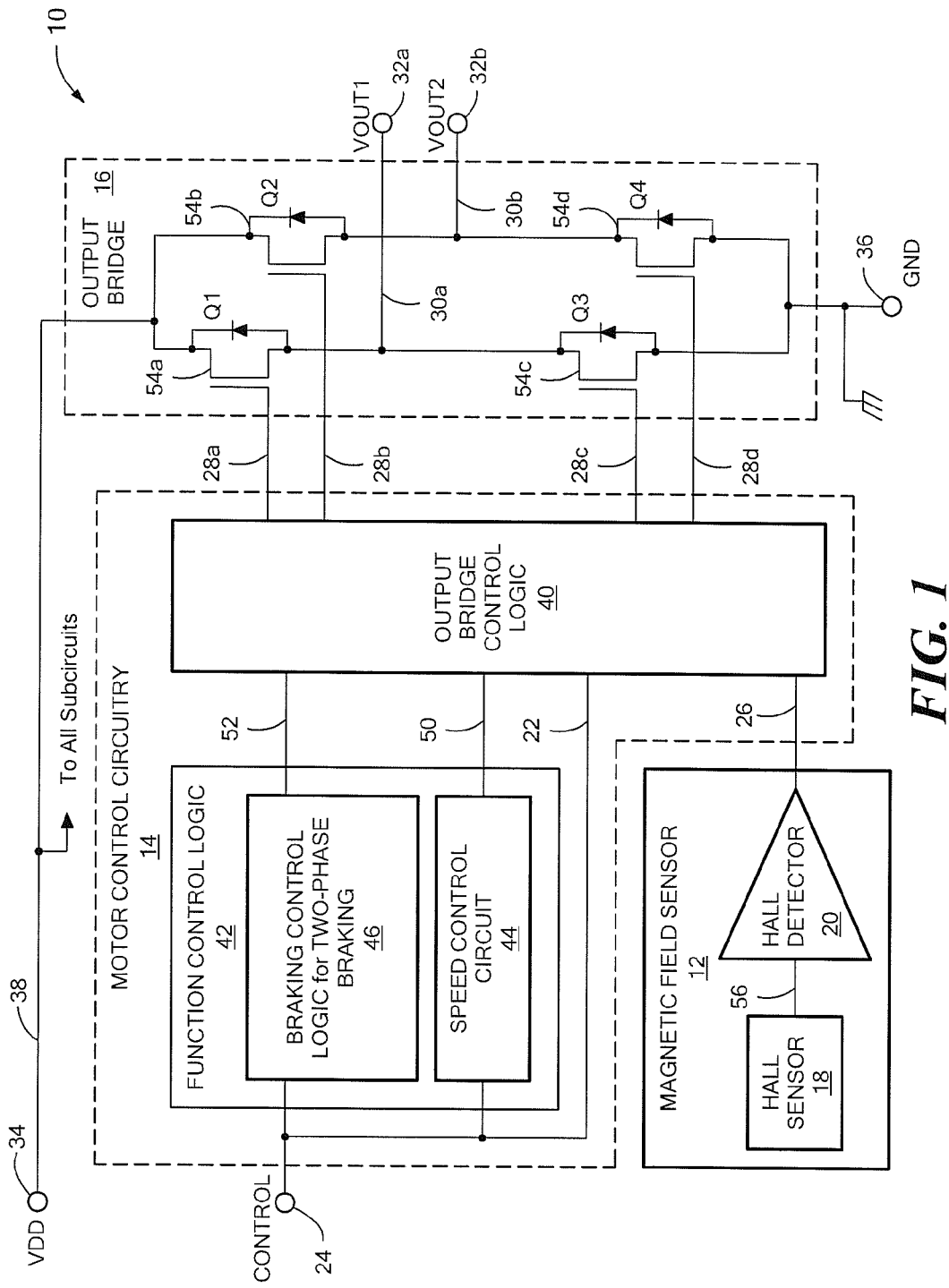
FIG. 1 is a block diagram of an exemplary motor control device that includes a braking control circuit to support a two-phase braking operation for braking an external single-coil brushless DC (BLDC) motor.

Referring to FIG. 1, an exemplary embodiment of a motor control device (or circuit) 10 for controlling rotational movement of an external single-coil brushless DC motor (BLDC) is shown. The motor control device 10 includes a magnetic field sensor 12, motor control circuitry 14 and an output structure in the form of an output bridge 16. The output bridge 16 serves as a motor driver circuit. The magnetic field sensor 12 may be any magnetic field sensing device, for example, one that includes a Hall sensor 18 and detector 20, as shown.

Still referring to FIG. 1, the motor control circuitry 14 receives as a first input signal 22 a control signal generated by an external source via an input (or control input, "CONTROL") terminal 24. It receives the output of the magnetic field sensor 12 as a second input signal 26. The circuitry 14 provides output control signals 28a-28d to the output bridge 16, which converts them to output voltages 30a and 30b, made available at corresponding voltage output terminals 32a (VOUT1), 32b (VOUT2). When a motor coil is connected between these terminals, a drive current flows through the motor coil. The output bridge 16 thus provides the drive current to the motor coil for forward driving or active braking.

Device 10 also includes a supply voltage ("VDD") terminal 34 and a ground (GND) terminal 36. The supply voltage terminal 34 is coupled to the output bridge 16 and all subcircuits via lines 38 and is used to connect those circuits to an external supply. The GND terminal 36 is coupled to internal circuitry and is used to connect that circuitry to an external ground.

The motor control circuitry 14 includes an output bridge control logic block 40 and a function control logic block 42. The latter block supports various device control functions, including but not limited to speed control (such as a PWM control) 44 and braking control 46. The braking control circuit 46 provides the necessary control logic to support a two-phase braking operation, as will be described.

Each of logic blocks 44 and 46 is coupled to input 24 via the control line 22. The logic blocks 44 and 46 are coupled to the output bridge control logic 40 via output lines 50 and 52, respectively.

Still referring to FIG. 1, the output bridge 16 may be implemented as a full (or H) bridge for bidirectional current flow. The output bridge output is provided at output 32a, which connects to one end of an external coil, and the output 32b, which connects to the other end of the external coil. In the illustrated embodiment, the H-bridge is constructed with four solid-state switches 54a, 54b, 54c, 54d (also labeled Q1, Q2, Q3, Q4, respectively). When Q1 and Q4 are closed (and Q2 and Q3 are open), current flows through the external coil in one direction from VOUT1 to VOUT2. Opening Q1 and Q4 and closing Q2 and Q3 causes current to flow through the coil in the reverse direction, from VOUT2 to VOUT1.

The input 24 allows a user to control functions performed by the motor control device 10. It can be to control motor speed or to initiate a braking function. Other functions may be supported as well. For example, the input may be used as an enable to engage low-power sleep mode for low-power applications. It will be appreciated that this multi-function control input could be replaced with separate inputs dedicated to specific functions. The signal provided to control input 24 may be a pulse width modulation (PWM) input signal or constant analog voltage.

Applying signals of a first logic level, for example, high signals, turns on the output bridge 16 so as to provide a drive current to the coil in a direction determined according to a magnetic field detected by the sensor 12. When the control input 24 receives signals of a second logic level (for example, a low level, i.e., the control input is pulled to GND), the device 10 initiates a braking operation to stop the motor. The device 10 may be implemented to enter the sleep mode, if a sleep mode is supported, once the braking operation has ended. The device 10 becomes active again (that is, it resumes forward drive operation) when the first logic level is again applied to the control input 24.

The Hall sensor 18 includes a magnetic field sensing element (or magnetic field transducer) to sense a magnetic field and provides a magnetic field signal 56, for example, a voltage signal, proportional to the sensed magnetic field. The Hall detector 20 processes the magnetic field signal 56 to produce the detector output 26, which indicates a magnetic polarity transition (hereinafter, simply "magnetic transition").

The sensing element may include a single magnetically responsive element or, alternatively, may include two or more such elements arranged in various configurations. In the illustrative embodiment, the sensor 18 is shown as a Hall sensor and would thus include a Hall-effect element as the sensing element. However, the sensor 18 can be any type of sensor and is therefore not limited to the Hall-effect sensor shown in FIG. 1. The element or elements of the internal sensing element may take a form other than that of a Hall-effect element, such as a magnetoresistance (MR) element. An MR element may be made from any type of MR device, including, but not limited to: an anisotropic magnetoresistance (AMR) device; a giant magnetoresistance (GMR) device; and a magnetic tunnel junction (MTJ, also known as spin-dependent tunneling or "SDT") tunneling magnetoresistance (TMR) device.

In addition to a sensing element, the sensor 18 may contain various other conventional circuits that operate collectively to generate the magnetic field signal 56. Generally, in addition to a sensing element, the sensor 18 contains at least an amplifier for amplifying the output signal of the sensing element.

Figure 2:
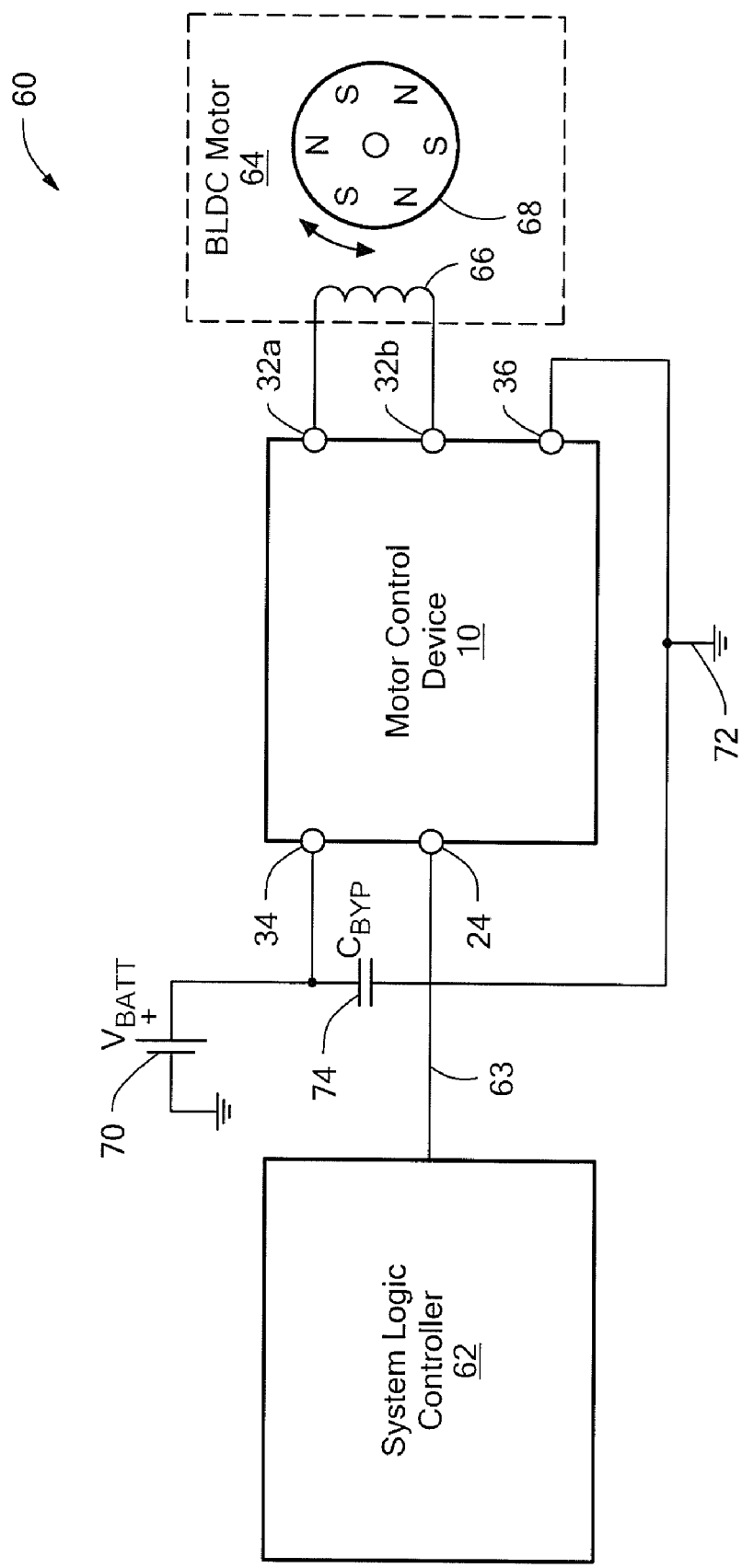
FIG. 2 is a circuit diagram of an exemplary application of the motor control device for controlling a single-coil BLDC motor.

FIG. 2 shows a simplified depiction of a motor control application 60 that employs the device 10. The application 60 includes a system logic controller (e.g., a processor or embedded controller) connected to the device 10. The system logic controller 62 is coupled to the control input 24 of device 10 by a connection 63 and provides various control input signals to the device 10 through that connection. The application 60 also includes a BLDC motor 64 having a coil 66 and a permanent magnet 68 shown as a ring magnet. Physically, the coil 66 may be constructed with one section of coil or multiple sections of coil connected in series to form "a single coil". The magnet 68 can have any desired number of pole pairs, not just three as shown. The device 10 controls the movement of the magnet 68 with the coil 66. The output terminals of the device 10 are connected to the coil 66. The coil 66 is connected at one end to output terminal 32a and is connected at the other end to output terminal 32b. In the illustrated application, the VDD terminal 34a (of device 10) is connected to a power supply shown as a battery 70 and the GND terminal 36 is connected to system ground 72. A bypass capacitor 74 is provided between the supply 70 and ground 72.

It will be appreciated that the depiction of motor 64 in FIG. 2 is intended to be only a simple representation. It will be understood that, in a basic BLDC motor construction, the motor 64 would typically include a rotor and a stator. The rotor would include a multi-pole permanent magnet (like the ring magnet 68) and the stator would include an assembly in which a coil (like coil 66) and a motor control circuit connected to the coil are located. In the illustrated application 60, the motor control circuit is implemented as device 10.

Referring now to FIGS. 1-2, the motor control device 10 operates to control an external motor such as motor 64 as follows. Commutation is performed electrically by the switches (Q1-Q4) of the output structure 16. The sensor 12 provides the commutation signal that controls the output bridge control logic 40 for the output structure 16. When the device 10 powers up, the sensor 12 senses the magnetic field of the motor's magnet and activates the output bridge 16. More specifically, the switches are set according to the magnetic pole in order to spin the rotor in the proper direction. For example, when the device 10 senses a south polarity magnetic field, the switches Q1 and Q4 may be activated, driving current from VOUT1 to VOUT2. As a north polarity magnetic pole approaches (due to rotation), Q1 and Q4 are turned off and Q2 and Q3 are turned on. This drives current in the opposite direction from VOUT2 to VOUT1, which reverses the direction of current flowing in the coil. As the rotor spins, the passing magnetic poles are sensed by the sensor 12, which continually reverses the direction of current flowing in the coil.

When the rotation direction needs to be changed, as is the case for braking, the rotation is changed by changing the polarity of the output bridge 16. Motor speed control is controlled by controlling the amount of the drive current provided to the coil.

As mentioned earlier, the device 10 supports a two-phase braking operation. The two-phase braking approach performs active braking in a first phase (or "PHASE 1") followed by a second phase (or "PHASE 2") in which back EMF (BEMF)-based speed sensing is alternated with active braking. During the first phase of the braking operation, the device 10 performs active braking with speed sensing. The speed sensing of the first phase uses motor speed feedback that determines speed based on time differences between consecutive magnetic transitions of the motor's rotor. The magnetic transitions are detected by the magnetic field sensor 12. The second phase employs a hybrid approach that combines BEMF speed sensing and active braking. The speed sensing of the second phase uses motor feedback that determines speed based on the BEMF voltage induced at the coil.

In the first phase, active braking is performed until a First Low Speed Threshold (FLST) is reached. This first threshold, or FLST, corresponds to a first target speed. It is based on a maximum elapsed time between consecutive magnetic transitions. A timer is used to count clock pulses between consecutive magnetic transitions, thus the maximum elapsed time of the FLST is defined as a maximum time count. The maximum time count, when reached, indicates that the motor has decelerated to the point that its speed is at or below the first target speed.

In the second phase, the combination of BEMF speed sensing and active braking is performed until a Second Low Speed Threshold (SLST) is reached. This second threshold, or SLST, corresponds to a second target speed. The second target speed is lower than the first target speed by some predetermined amount. The SLST is based on a voltage level. When a measured BEMF peak voltage is determined to be below the voltage level of the SLST, the SLST is said to be reached (that is, the motor has decelerated further to the point that its speed is below the second target speed).

During the first phase it is possible to perform active braking (fastest deceleration ratio) at the same time the speed is determined. Once the FLST is reached, the device 10 begins the second braking phase by sensing the BEMF voltage and comparing that sensed BEMF voltage to the SLST voltage. After a magnetic transition arrives and before the next magnetic transition occurs, active braking is again performed. When the next magnetic transition occurs, the second phase of the braking operation starts sensing the back EMF once more. This cycle of alternating intervals of BEMF sensing and active braking repeats until the SLST is reached (the BEMF voltage is below the voltage level of the SLST), at which time the second phase (and, therefore, the entire two-phase braking process) is terminated. At this point, the device 10 powers down (or enters some other state, such as sleep or standby). It will be recognized that the BEMF sensing intervals may be intervals of passive braking. Passive braking may occur at other times as well, if time limits are applied to the active braking intervals, as will be described later. The amount of passive braking is inversely proportional to the observed BEMF sensitivity. A strongly shorted coil provides the maximum passive braking and the minimum output BEMF voltage. An open coil provides maximum BEMF signal but only a small amount of passive braking.

The time-based speed determination of the first phase determines the motor speed every time the magnetic poles pass by the sensor 12. More specifically, the time-based determination determines the time differences (in terms of time counts, as discussed above) between consecutive magnetic transitions. One of the main limitations of using only a time-based approach is the difficulty in detecting near zero RPM level, as the high deceleration rates can cause the rotor to spin in the opposite direction in very short times. Once the motor is accelerating in the opposite direction, it becomes difficult to detect the low speed threshold because the motor speed is high again (but in the opposite direction). Thus, the two-phase approach offers a conservative solution that detects a higher, time-based FLST. Until that detection, the maximum possible deceleration ratio, braking in each and every motor phase, can be achieved.

This two-phase approach combines the best characteristics of active braking (fast braking time) and BEMF sensing (precise lower speed threshold specification and avoidance of reverse spinning). Therefore, it advantageously allows braking to near zero RPM in as short a time as possible time.

Other timing controls in the form of specified time intervals or limits may be provided as safety features. These can include any one or more of the following: a Maximum Active Braking Time (MABT); a Maximum BEMF Sensing Time (MBST); and a Maximum Total Braking Time (MTBT). The MABT defines a time limit for braking pulses during active braking. When the time limit is reached, the braking control causes a transition from active braking to passive braking. The MABT can be used to prevent excessive deceleration during the active braking where uncertainty of the real instantaneous speed exists and longer than necessary driving causes the motor to spin backwards. It may be used in PHASE 1 or PHASE 2, or both phases, as will be described later. The MBST may be provided to limit the amount of time (that is, provide a maximum time window) for comparing the BEMF voltage to an SLST based voltage reference to determine if the SLST is achieved. The MTBT may be provided as a master timeout. For a timeout of 100 ms, for example, if 100 ms have elapsed since the beginning of the braking operation (regardless of the phase being performed), the braking operation is ended.

Figure 3:
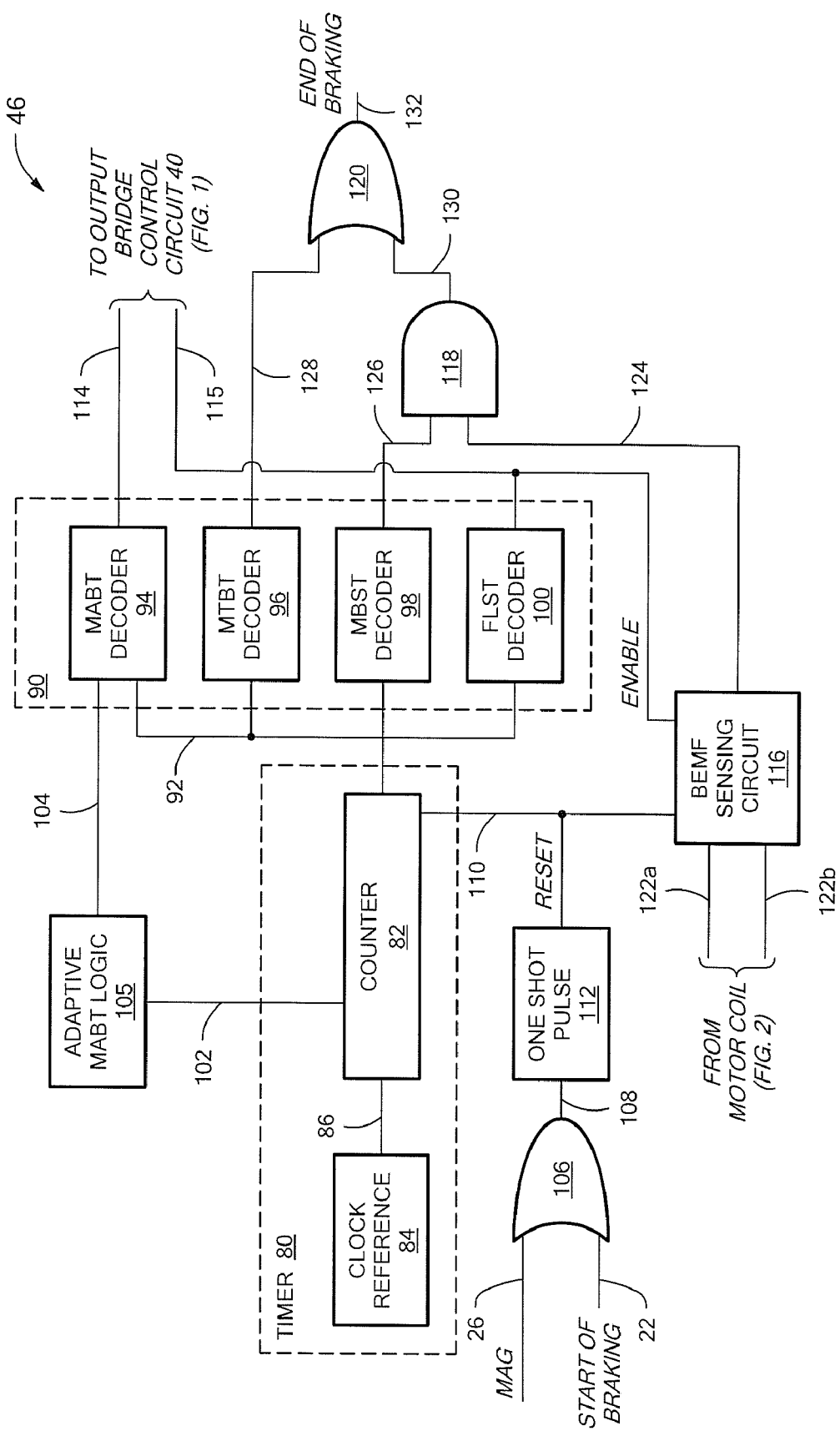
FIG. 3 is a circuit diagram of the braking control circuit according to one exemplary embodiment.

Referring to FIG. 3, details of the braking control logic block (or circuit) 46 according to one exemplary embodiment are shown. This implementation makes use of all of the time intervals and thresholds discussed above, but it will be understood that MABT, MBST and MTBT timing control mechanisms are optional and need not be included. The block 46 includes a timer 80 that uses an internal counter 82 coupled to a clock reference 84 to implement a time-based count for the various maximum time intervals and thresholds, MBST, FLST, MABT and MTBT, discussed earlier. The clock reference 84 generates a steady stream of clock pulses 86, which are provided to the counter 82. The counter 82 produces a count value 88, based on a count of the clock pulses. The count is provided to timer decoding logic 90, via decoder input 92. The decoding logic is implemented to include a MABT decoder 94, a MTBT decoder 96, a MBST decoder 98 and a FLST decoder 100, which decode the particular counts for their respective time intervals. Also coupled to the counter 82 and the MABT decoder 94 via lines 102, 104, respectively, is a logic block 105 shown as "adaptive MABT logic". This logic block allows the MABT to be adapted to suit the particular needs of each phase. For example, if the MABT is used in each phase, it may be desirable to make the MABT shorter for the second phase where speed is known to be lower and care must be taken to prevent reverse motor spinning. In addition, or alternatively, the MABT may be changed with successive transitions for a more fine-tuned control of active braking at increasingly lower speeds.

Further included in block 46 is a first OR gate 106, which provides a logic OR operation for inputs including the magnetic transition signal 26 produced by the sensor detector 20 (FIG. 1) when it compares the sensed magnetic field signal 56 to a set of pre-defined thresholds and the control input 22. When either a detection of a magnetic transition ("MAG") is indicated at input 26 or a Start of Braking (SOB) signal is provided at input 22, the OR gate 106 provides an output 108 that is used as a one-shot trigger to generate a one-shot-pulse 110 via a one-shot-pulse block 112. The one-shot-pulse 110 is used as a reset signal ("RESET") to reset the timer 80.

The MABT decoder 94 produces a MABT decoder output 114, indicative of an active braking state, that is provided to the output bridge control circuit 40 (FIG. 1). Also provided to the output bridge control circuit 40 is an enable signal ("ENABLE") 115, which is produced at the output of the FLST decoder 100. The configuration of the output bridge 16 (FIG. 1 ), in terms of polarity and/or conduction (as needed for active and passive braking) is determined by the output bridge control logic 40 (from FIG. 1) given the following: the SOB condition indicated on control input 22, the magnetic state 26, an active braking state of MABT decoder output 114 and the state of the ENABLE 115. The configuration of the output bridge 16 for passive braking and BEMF sensing (which occurs during passive braking). This configuration may involve shorting the coil's terminals or, alternatively, disconnecting the coil so that its terminals are floating, via appropriate control of the output structure switches 54a-54d. Again, as noted above, the amount of passive braking depends on the configuration (i.e., shorted or open coil) that is used.

Still referring to FIG. 3, the block 46 also includes a BEMF sensing circuit 116, an AND gate 118 and a second OR gate 120. The BEMF sensing circuit 116 receives as inputs voltages 122a, 122b measured at the motor coil. The ENABLE signal 115, also applied to the circuit 116, indicates a BEMF sensing "enabled" state when the FLST decoder 100 determines that the FLST threshold has been reached and that the phase 2 operation should begin (with BEMF sensing). The ENABLE signal 115 is also applied to the output bridge control logic 40 (as mentioned above). When the ENABLE signal 115 indicates a BEMF sensing "enabled" state, it causes the logic 40 to set the output bridge 16 in the proper bridge configuration for the BEMF sensing of coil voltage at the motor coil (and passive braking). An output 124 of the BEMF sensing circuit 116 is provided as a first input to the AND gate 118. A second AND gate input 126 is the output generated by the MBST decoder 98. The second OR gate 120 receives as a first input 128 the output of the MTBT decoder 96 and as a second input 130 an output provided by the AND gate 118. With reference to the AND gate 118, when the first input 126 indicates that the MBST has elapsed and the second input 124 indicates that the SLST has been reached (i.e., the BEMF voltage is below the voltage level of the SLST), the AND gate output (OR gate input) 130 signals an end of braking (EOB). The output of OR gate 120, output 132, indicates an end of braking when either OR gate input 130 or input 128 (MTBT decoder output) signals an end of braking. Thus, the end of braking can be declared by the optional MTBT event (indicating the master timeout has been reached) or the SLST being reached.

Figure 4:
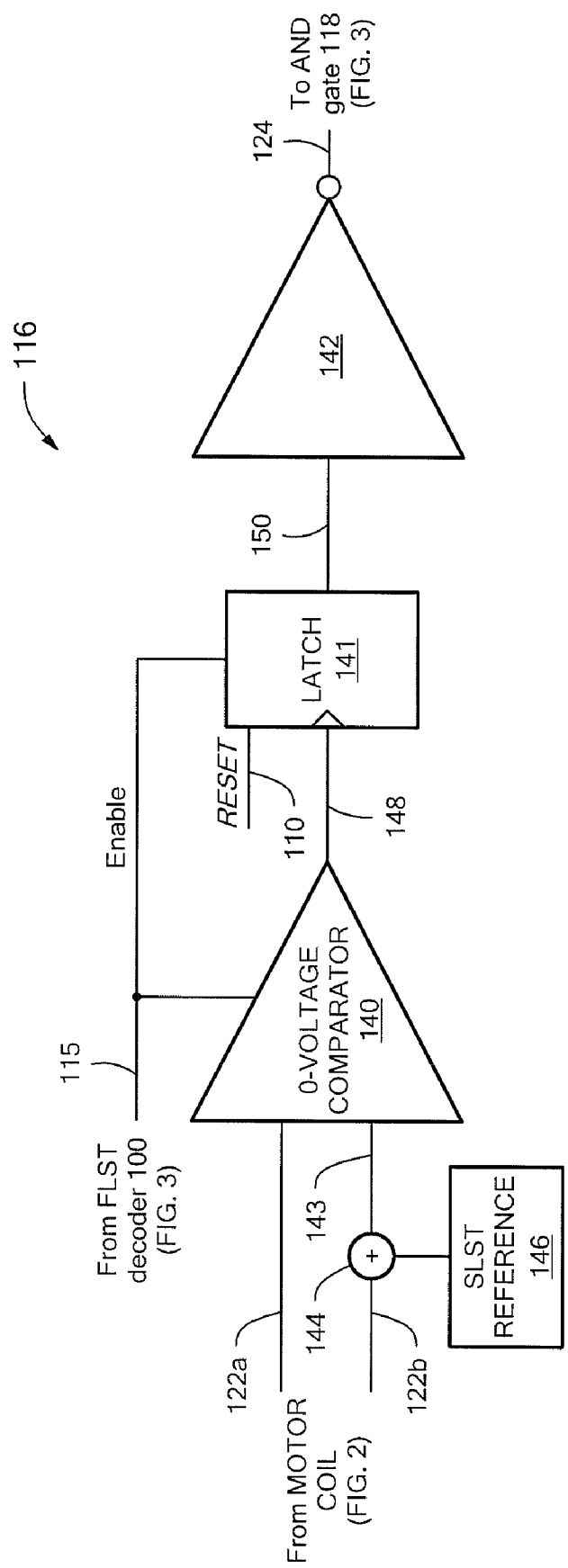
FIG. 4 is a circuit diagram of a BEMF sensing circuit according to one exemplary embodiment.

Referring to FIG. 4, an exemplary implementation of the BEMF sensing circuit 116 is shown. During BEMF sensing, the coil windings are allowed to float (that is, the current is removed from the coil) and the inertia in the motor and mechanical system keeps it spinning while a measurement of the voltage generated by the coil is taken. The peak voltage observed is directly proportional to the motor's speed. The circuit 116 includes a zero-crossing voltage comparator 140, a latch 141 and an inverter 142. The PHASE 2 operation of both the latch 141 and the comparator 140 are enabled by the ENABLE signal 115 provided by the FLST decoder 100 (FIG. 3) as an indicator that the FLST was reached. The comparator 140 performs a comparison between the voltage 122a at one of end of the motor coil and a voltage shifted version 143 of the voltage 122b measured at the other end of the motor coil. The voltage shifting is produced by a summer 144, which adds to the voltage 122b a reference voltage 146 equal to the voltage for the SLST. If the comparator 140 triggers at any time, indicating a crossing of the comparator's reference input by the BEMF voltage, the event is captured at comparator output 148 and latched by the latch 141. This latched event is provided to the inverter 142 via a latch output 150. In the absence of a reference-crossing condition (i.e., when the BEMF voltage is below the reference voltage and therefore below the SLST), the state of the inverter output indicates that the SLST is reached.

The output of the inverter 142 is provided to the AND gate 118 via output 124. As discussed above, an output of the BEMF sensing circuit 116 indicating at output 124 that the BEMF voltage is below the comparator's reference input and therefore the SLST has been reached is the other cause for an EOB declaration.

Figure 5:
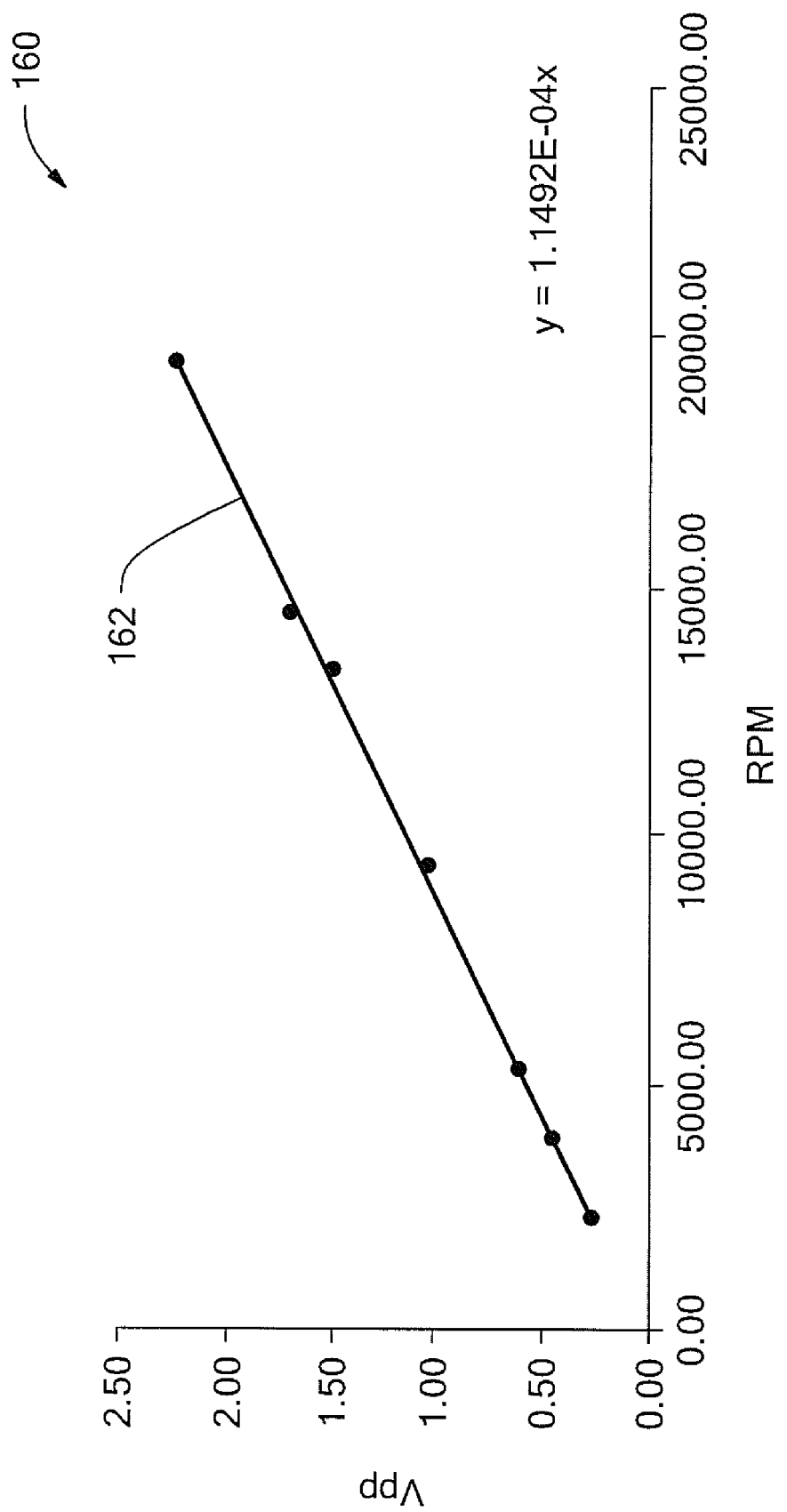
FIG. 5 shows a plot of BEMF peak voltage versus rotations per minute (RPM) obtained for a single-coil BLDC motor.

FIG. 5 shows a graph 160 that illustrates the relationship between the BEMF voltage (labeled "Vpp", in Volts), and motor speed ("RPM") during motor operation (either normal driving or braking) for a certain type of motors. As can be seen in the figure, a plot 162 of Vpp versus RPM shows that the BEMF voltage is linearly proportional to the RPM of a motor. Thus, this linear relationship can be used to select an appropriate voltage threshold for SLST given a target speed. The target speed may be defined as or below some percentage, for example 10%, of the maximum speed. If the SLST is chosen to be below, say, 10% of the maximum speed, a maximum desired value for the low speed threshold is 1.8 KRPM for a maximum speed of 18 KRPM. Setting the BEMF comparator's SLST reference voltage to 75 mV thus ensures less than 1.3 KRPM for SLST on this particular set of motors.

The motor speed is also ideally a linear function of the supply voltage. Therefore, at lower voltages, the maximum RPM the motor can reach is lower than at higher supply voltages. Optionally, to track a minimum lower speed threshold specification (for example, a minimum 10% lower speed threshold specification) with the supply voltage variations, a supply dependent threshold may be set through a ratiometric current. As a result, for example, a lower "low speed threshold" such as SLST will result when powering the device at 1.8 Vdc than at 4.2 Vdc. Therefore, these supply dependent thresholds ensure that the low speed threshold is below some percentage of the maximum RPM for different supply voltages.

Depending on the type of motor being controlled, the waveform of the generated BEMF may have a sinusoidal, trapezoidal or other shape. For some shapes, the peak may occur at any point of the magnetic pulse length. When the waveform of the generated BEMF is a sinusoidal one, however, the peak will occur at or near the center of the magnetic pulse. The maximum BEMF magnitude is therefore expected in the middle between two consecutive magnetic transitions. For a sinusoidal waveform, blanking may be applied to a portion (or portions) of the BEMF sensing waveform known to be too low (and therefore prone to electrical noise corruption) and away from the known peak voltage position within the magnetic pulse. Through blanking (or other techniques) such sources of error may be avoided.

Figure 6:
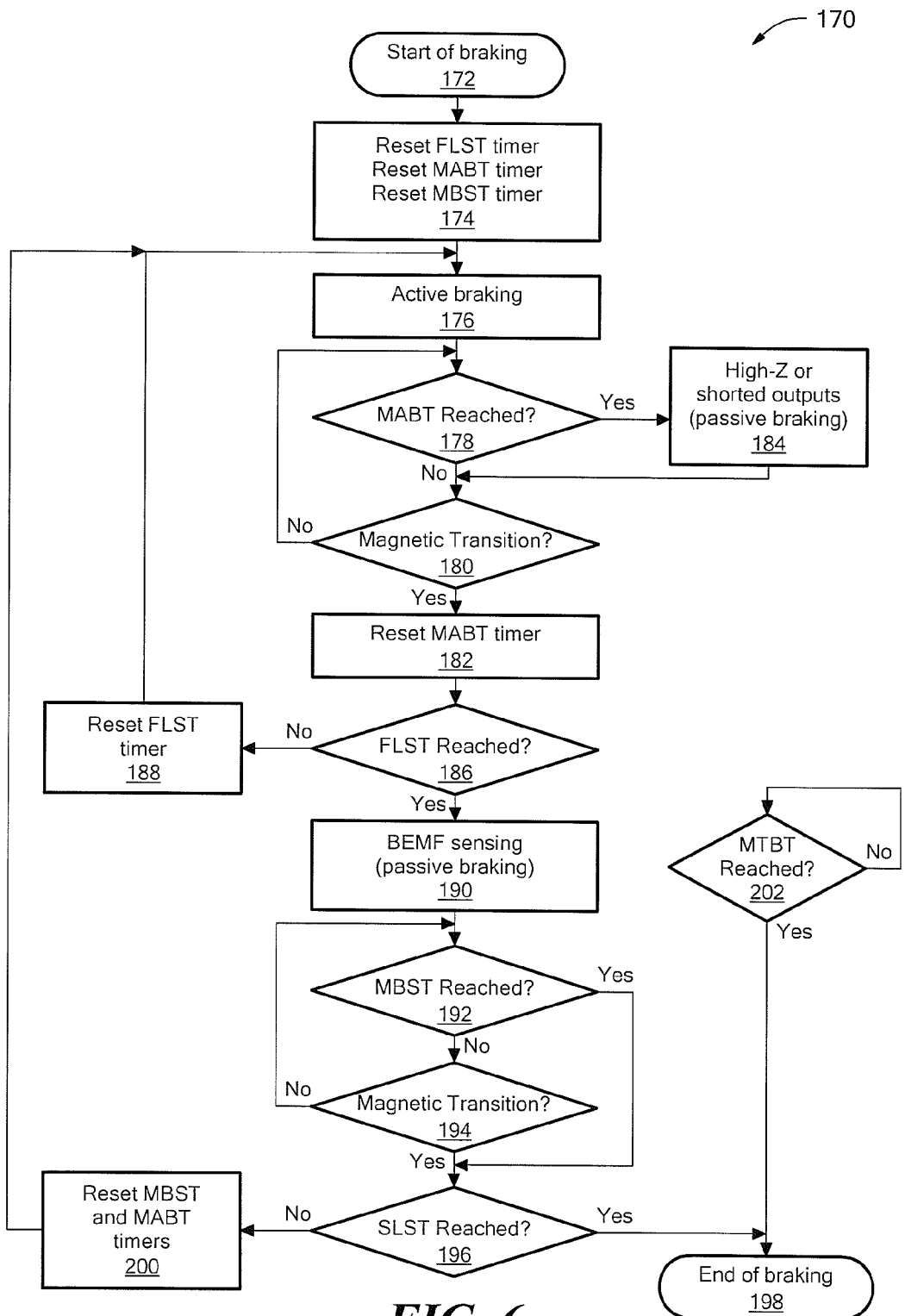
FIG. 6 is a flow diagram illustrating an exemplary two-phase braking operation.

FIG. 6 illustrates a flow diagram for the two-phase braking operation ("operation"), shown here as operation 170. The embodiment illustrated in FIG. 6 makes use of all of the optional MABT, MBST and MTBT braking control features. The braking operation is initiated when a start of braking signal is received (block 172). Once the operation is initiated, timers for the FLST, MABT and MBST are reset (block 174). A first phase of the braking begins with active braking (block 176). The operation determines if the MABT has been reached (block 178). If it has not yet been reached, but a magnetic transition has occurred (block 180), the operation resets the MABT timer (block 182). If a magnetic transition has not occurred (at block 180), the operation continues to determine if the MABT has been reached (at block 178). If it is determined that the MABT has been reached, the bridge output structure outputs will be shorted (with a certain resistance) or placed in a high-impedance state (block 184). At this point, braking changes from active to passive (to the degree allowed by the "strength" of the shorting or opening of the coil, as discussed above).

The operation still checks for a next magnetic transition (at block 180). After a reset of the MABT timer at block 182, the operation determines if the first speed threshold, FLST, has been reached (block 186). If it has not, then FLST timer will be reset (block 188) and the operation returns to block 176 for further active braking. If, on the other hand, the FLST has been reached, the operation proceeds to the second phase of the operation. The second phase begins with BEMF sensing (block 190). The operation determines if the MBST limit has been reached (block 192). If it has not been reached, the operation looks for a magnetic transition (at block 194). If a magnetic transition has not been detected, the operation returns to check MBST (at block 192). If a magnetic transition has been detected, the operation determines if the SLST has been reached (block 196). If the SLST has been reached, indicating that the motor speed has been reduced to below the corresponding target speed, the operation declares an end of braking (block 198). Otherwise, if the SLST has not yet been reached, the operation resets the MBST and MABT timers (block 200) and returns to block 176 for more PHASE 2 active braking. Referring back to block 192, if the MBST has been reached, the operation goes directly to the SLST determination at block 196.

As discussed above, the braking operation may use a master timer MTBT to determine when a maximum time interval (measured from the beginning of the start of braking) has elapsed (block 202). When that time has expired, the operation will signal an end to braking at block 198. Thus, the braking operation terminates either when the SLST is reached or the MTBT is reached.

Figure 7A:
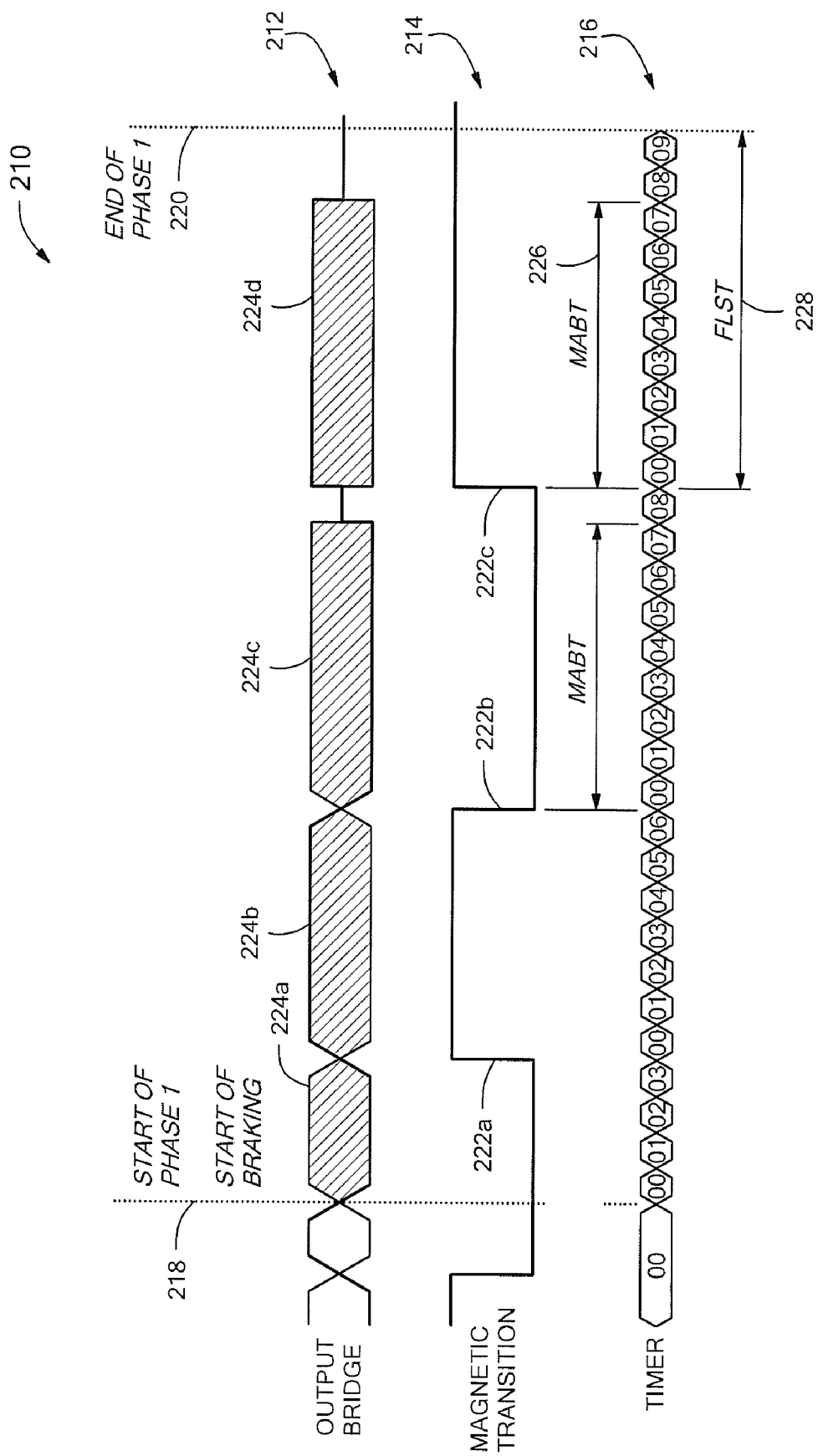
FIGS. 7A-C show timing diagrams for the first phase (FIG. 7A) and second phase (FIGS. 7B-C) of an exemplary two-phase braking operation.
Figure 7B:
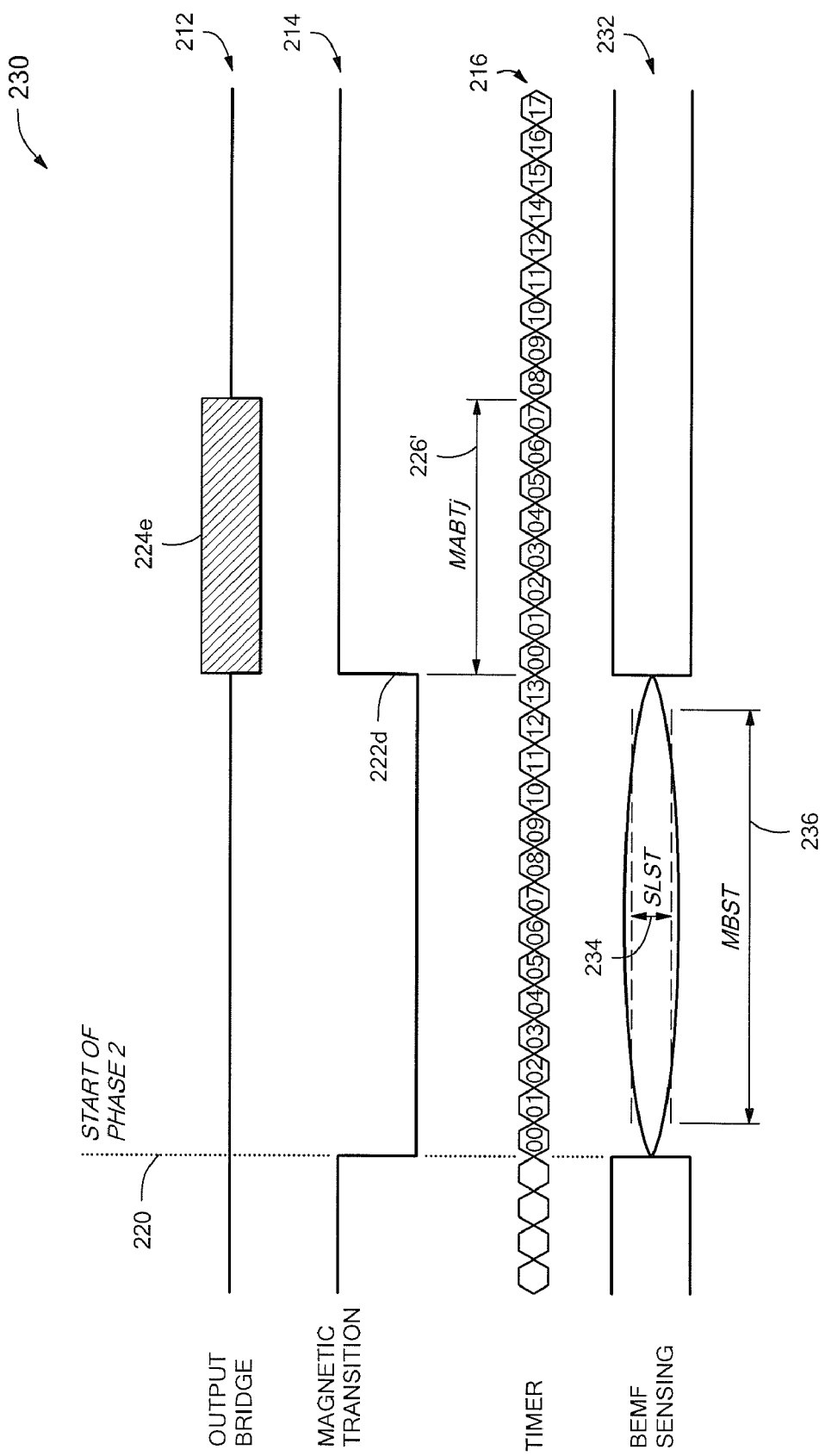
Figure 7C:
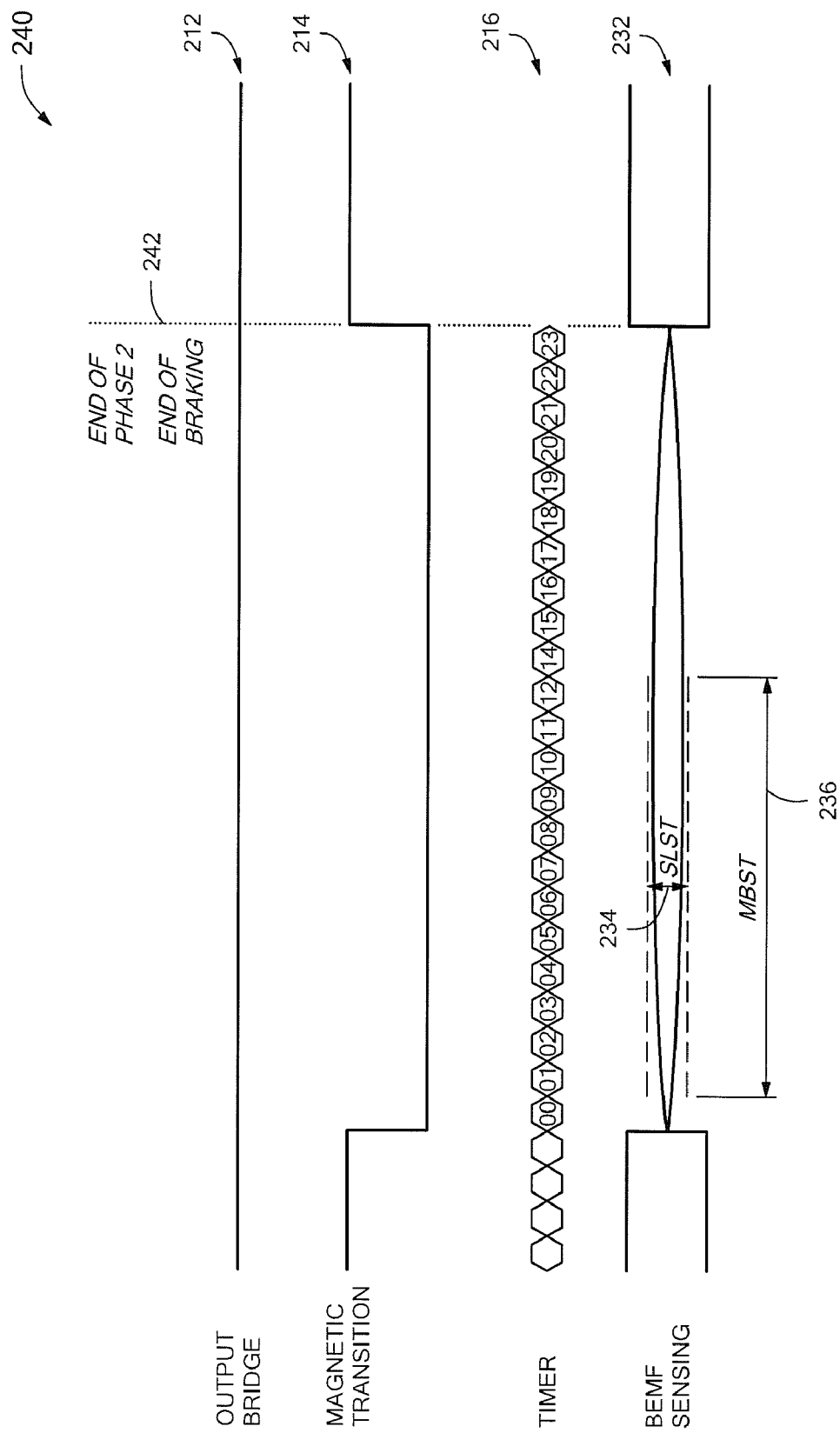

FIGS. 7A-7C are timing diagrams showing various waveforms associated with the device 10 of FIG. 1 during the two-phase braking operation. FIG. 7A shows the timing for the first phase (active braking with time-based speed sensing). FIG. 7B and 7C show the timing for the second phase, which includes periods of BEMF sensing (for BEMF voltage-based speed sensing) alternating with periods of active braking. The shaded areas in the figures indicate periods of active braking.

Referring first to FIG. 7A, a first phase braking timing diagram 210 shows output waveforms 212, 214 and 216 for the output bridge, magnetic transition (detector output) and timer, respectively. A beginning of PHASE 1 (also the start of braking) is indicated by reference numeral 218 and an end of PHASE 1 is indicated by reference numeral 220. During normal motor driving, prior to the beginning of the PHASE 1, the magnetic signal detected by the Hall sensor would be processed and used for driving the motor coil with a certain "forward", accelerating polarity. Once the "Start Of Braking" (SOB) signal is detected, PHASE 1 commences with active braking. During active braking, each magnetic transition (for example, transition 222a, transition 222b, transition 222c, and so on) is reflected on the motor coil via the output bridge. The output bridge produces a sequence of braking pulses, for example, braking pulses 224a, 224b, 224c, 224d). The length of the braking pulses are determined by the time between magnetic transitions. The length of the braking pulse may be limited to a maximum defined by the MABT (shown here as MABT 226). Thus, as the magnetic pulses become longer and longer, the braking torque is also time-limited to avoid excessive torque and reduce the potential for accidental reverse rotation. Once the timer (reset at the beginning of each magnetic pulse) reaches the MABT, the output of the bridge is disabled (either set to open the coil or short it) so that no active driving is provided to the motor. Eventually, as magnetic pulses become longer, the FLST (shown here as FLST 228) is reached. This event marks the end of PHASE 1 and the beginning of PHASE 2.

Referring to FIG. 7B, a second phase braking timing diagram 230 shows output waveforms 212, 214, 216 and 232 for the output bridge, magnetic transition (detector output) timer and BEMF sensing, respectively, for a first portion of PHASE 2. PHASE 2 commences with BEMF sensing, that is, with a measurement of the amplitude of the BEMF voltage on the motor coil being taken to determine speed. The voltage-based threshold SLST (indicated in the figure by reference number 234) is used as a reference for comparison with the BEMF voltage on the coil. If this BEMF voltage (its peak being directly proportional to the motor speed) crosses the SLST reference, then the speed of the motor is above the SLST-equivalent speed threshold and the speed threshold specified for PHASE 2 has not yet been reached.

The MBST may be provided as a maximum time "window" (indicated by reference numeral 236) in which the BEMF is sensed. This feature allows, on those motors in which the BEMF is known to have its peak near the middle of the magnetic pulse length, the measurement to avoid the ends of the magnetic pulse in which the BEMF is known to be very small and prone to commutation noise errors. If, at any time during MBST 236, the threshold SLST 234 is crossed, this condition is latched so that, at the end of MBST or the magnetic pulse, e.g., at transition 222d (whichever is shorter), a decision about motor speed can be made. If the motor speed is determined to still be high enough (i.e., the BEMF did cross the SLST reference voltage at any time during MBST), a new magnetic period MABT shown here as MABTj 226' can be used for time-limited active braking to limit the length of the braking pulses, e.g., braking pulse 224e. This time limitation can be different than the one(s) used during PHASE1. Also, this MABTj can be changed during successive magnetic transitions to allow for a smoother, more-careful, braking when nearing zero-speed.

Referring to FIG. 7C, a second phase braking timing diagram 240 shows output waveforms 212, 214, 216 and 232 for the output bridge, magnetic transition (detector output) timer and BEMF sensing, respectively, for a second (later) portion of PHASE 2. During PHASE 2 operation, the cycle of "one BEMF sensing and one active braking" period is repeated until, eventually, one of the MBST sensing windows will not detect the BEMF voltage crossing the SLST. When this occurs, the "End Of Braking" (EOB) state (indicated here by reference numeral 242) is declared, marking the end of PHASE 2 and of the entire braking operation.

Although not shown in these figures, the EOB can also be reached by reaching the MTBT, which limits the time length of the entire operation. Since the pulse-length becomes longer and longer, the operation can end up waiting for a magnetic transition that never arrives (true zero speed). The use of the MTBT prevents this situation from occurring.

The SLST indirectly sets a time-based speed limit, when the BEMF sensing is confined to the MBST window. If the SLST reference has not been crossed within MBST, then the braking operation determines the speed is too low and signals the EOB. If the peak of the BEMF occurs near the middle of the magnetic pulse, the BEMF peak can occur outside the MBST if the speed is low (i.e., if the middle of the magnetic pulse happens after the MBST ends). Because the amplitude of BEMF and the pulse-length of the magnetic pulse are correlated (by the motor speed), the SLST and the MBST can be chosen to reflect similar speed thresholds given the shape of the BEMF waveform and its speed-to-amplitude ratio.

The device 10 may be provided in the form of an integrated circuit (IC) containing a semiconductor substrate on which the various circuit elements are formed. Such an IC would have at least one pin to correspond to each of: the input 24, VDD input or terminal 34, GND terminal 36 and the outputs (VOUT1 and VOUT2) 32a, 32b. It will be appreciated that the functionality of the IC, that is, the circuit elements contained within it, can be varied to suit a particular application.

The device 10 (FIG. 1), with the smart braking mechanism as described above, is particularly well-suited to single-coil brushless DC motor drive applications. The types of DC motors that might be controlled/driven by such a device include small motors such as vibration motors.

Other applications are contemplated as well. For example, the device 10 may be used to control a BLDC motor with more than one coil. Referring back to FIGS. 1-2, the motor 64 could have a two-coil arrangement and the output structure 16 of device 10 could be implemented as a unipolar drive circuit with transistors to drive the two coils, as one example. In one such configuration, one end of each coil would be connected to VDD and the other end to a transistor to GND. In another configuration, one end of each coil would be connected to GND and the other end to a transistor to VDD. The braking control 46 and output bridge control logic block 40 could be operated to control the output structure 16 so that active braking is performed using both coils and BEMF sensing is performed using either coil or, alternatively, both coils (by properly connecting the BEMF voltages in series) for higher sensitivity. As with the full bridge, changing rotational direction for braking would be achieved by reversing the polarity of the output structure.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A motor control circuit comprising:
   a motor driver circuit to apply a brake current to a coil of an external motor for active braking of the motor;
   a braking control circuit, coupled to the motor driver circuit and responsive to an externally generated control signal, to control the active braking by the motor drive circuit so that the active braking occurs in two phases; and
   wherein the two phases include a first phase comprising a first portion of the active braking, and a second phase comprising back electromotive force (BEMF) voltage sensing and a second portion of the active braking.

2. The motor control circuit of claim 1 wherein the braking control circuit comprises circuitry to start the second phase when a first low speed threshold (FLST) is reached during the first phase.

3. The motor control circuit of claim 2 wherein the FLST is a time-based threshold.

4. The motor control circuit of claim 1 wherein the braking control circuit comprises circuitry to determine when a second low speed threshold (SLST) is reached during the second phase.

5. The motor control circuit of claim 4 wherein the SLST is a voltage-based threshold.

6. The motor control circuit of claim 5 wherein the braking control circuit further comprises a BEMF sensing circuit to obtain a BEMF voltage from the coil and to compare the BEMF voltage to the voltage-based threshold.

7. The motor control circuit of claim 4 wherein braking control circuit further comprises circuitry to define a maximum time window in which the SLST determination is made.

8. The motor control circuit of claim 7 wherein the braking control circuit further comprises logic to indicate an end of the second phase when the SLST is reached within the maximum time window.

9. The motor control circuit of claim 7 wherein the braking control circuit further comprises logic to indicate an end of the second phase when either the SLST is reached within the maximum time window or a maximum timeout has occurred.

10. The motor control circuit of claim 2 wherein the BEMF sensing comprises intervals of BEMF sensing and the second portion of the active braking comprises intervals of active braking, and wherein the BEMF sensing intervals alternate with the active braking intervals during the second phase according to magnetic transitions of the motor and timing control of the braking control circuit.

11. The motor control circuit of claim 10 wherein the timing control requires that the second phase be ended when a SLST is reached.

12. The motor control circuit of claim 1 wherein the braking control circuit comprises a magnetic transition detector to generate an output indicative of magnetic transitions of a magnet in the motor as the motor rotates during the active braking, wherein braking current applied during the active braking comprises braking pulses which begin with each magnetic transition, and wherein the braking control circuit further comprises logic to determine a maximum active braking time (MABT) limit relative to each braking pulse in the first phase and to control the motor drive circuit to discontinue the application of braking pulses in the first phase when the MABT limit is reached.

13. The motor control circuit of claim 12 wherein the braking control circuit further comprises logic to determine a MABT limit relative to each braking pulse in the second phase and to control the motor drive circuit to discontinue the application of braking pulses in the second phase when the MABT of the second phase is reached.

14. The motor control circuit of claim 13 wherein the MABT of the first phase differs from the MABT of the second phase.

15. The motor control circuit of claim 13 wherein the MABT of the second phase is capable of being adapted to behavior of the motor as the second phase progresses.

16. The motor control circuit of claim 1 wherein the braking control circuit further comprises logic to determine when a maximum timeout measured from a start of the first phase is reached and to end the second phase when the maximum timeout is reached.

17. The motor control circuit of claim 1 wherein the motor driver circuit comprises circuitry configured as an H-bridge.

18. The motor control circuit of claim 1 further comprising a magnetic field sensor that includes a Hall sensor and a Hall detector.

19. The motor control circuit of claim 1 further comprising a magnetic field sensor, and wherein the motor driver circuit, the braking control circuit and the magnetic field sensor are integrated as a semiconductor integrated circuit.

20. A system comprising:
   a system logic controller; and
   a motor control circuit, coupled to the controller, comprising:
   a motor drive circuit to apply a brake current to a coil of an external motor for active braking of the motor;
   a braking control circuit, coupled to the motor drive circuit and responsive to a control signal by the system logic controller, to control the active braking by the motor drive circuit so that the active braking occurs in two phases; and
   wherein the two phases include a first phase comprising a first portion of the active braking, and a second phase comprising back electromotive force (BEMF) voltage sensing and a second portion of the active braking.

* * * * *

UNITED STATES PATENT AND TRADEMARK OFFICE
CERTIFICATE OF CORRECTION

PATENT NO. : 8,093,844 B2
APPLICATION NO. : 12/402580
DATED : January 10, 2012
INVENTOR(S) : Alejandro G. Milesi et al.

It is certified that error appears in the above-identified patent and that said Letters Patent is hereby corrected as shown below:

Column 1, line 39 delete "that is" and replace with --that it--.

Column 6, line 2 delete "possible time." and replace with --possible.--.

Column 7, line 58 delete "one of end" and replace with --one end--.

Column 8, line 13 delete "motors." and replace with --motor.--.

Column 9, line 8 delete "then FLST" and replace with --then the FLST--.

Column 9, line 38 delete "FIG." and replace with --FIGS.--.

Column 10, line 8 delete "PHASE 2commences" and replace with --PHASE 2 commences--.

Column 10, line 33 delete "PHASE1." and replace with --PHASE 1--.

Column 11, line 61 delete "wherein braking" and replace with --wherein the braking--.

Signed and Sealed this
Seventh Day of August, 2012

David J. Kappos
*Director of the United States Patent and Trademark Office*